United States Patent [19]
Kent

[11] 3,863,175

[45] Jan. 28, 1975

[54] OSCILLATOR DEVICE HAVING REMOTE RADIATION-FREE SWITCH MEANS

[75] Inventor: George A. Kent, West Los Angeles, Calif.

[73] Assignee: The Magnavox Company, Fort Wayne, Ind.

[22] Filed: Mar. 29, 1973

[21] Appl. No.: 346,212

[52] U.S. Cl. .................... 331/67, 325/357, 325/416, 325/449, 325/464, 331/77, 331/117 R, 331/179

[51] Int. Cl. .......................................... H03b 19/00

[58] Field of Search .............. 331/117, 77, 67, 179; 325/416, 449, 453, 464, 357

*Primary Examiner*—John Kominski
*Attorney, Agent, or Firm*—Thomas A. Briody; William W. Holloway, Jr.; Richard T. Seeger

[57] ABSTRACT

A radio frequency device, e.g., an oscillator having multiple modes, e.g., oscillation rates, with means to select a particular mode from a remote selection station. This invention provides transistor operated selection means at the radio frequency site and connection by means of an ordinary non-shielded line to a remote manual selection station with the coupling between the transistor selection means and the remote selection station being free of rf energy and resultant radiation.

6 Claims, 2 Drawing Figures

OSCILLATOR DEVICE HAVING REMOTE RADIATION-FREE SWITCH MEANS

BACKGROUND OF THE INVENTION

This invention pertains to a radiation emission device, such as an oscillator, having multiple states of operation, such as multiple oscillator frequencies. The frequency of the oscillator means can be selected from a remote location, such as the front panel of the housing for the radiation device, with the coupling between the radio frequency emission device and the front panel switch being radiation free so that ordinary unshielded wire may be used for this coupling.

In the past, where it was necessary to have a switch that was remotely located from the shielded radiation source, a coaxial shielded cable was required between the switch and the radiation source, or it was required that the mounting of the shielded radiation source be at the front control panel in order to eliminate objectionable radio frequency radiation.

This invention provides a radio frequency oscillator having two states of oscillation frequency with a transistor connected across an impedance in the oscillator tank circuit to short out this impedance when the transistor is energized. This change in impedance will change the oscillator to a different frequency.

The transistor is controlled by a manual switch which applies a dc control voltage to the transistor to change the conduction mode of the transistor which in turn controls the oscillation mode of the oscillator. Since the connecting line between the remotely located manual switch and the transistor carries only dc energy, it is free of rf radiation.

In the particular embodiment shown, the oscillator output is modulated by a composite video signal and then fed to an rf transformer filter having two frequency passbands corresponding to Channels 3 and 4 in a TV receiver. Of course, more frequencies can be provided for selection if desired.

These and other objects and advantages of this invention will become more apparent when a preferred embodiment is considered in connection with the following drawings.

DESCRIPTION OF PREFERRED EMBODIMENT

Figures 1, 2:
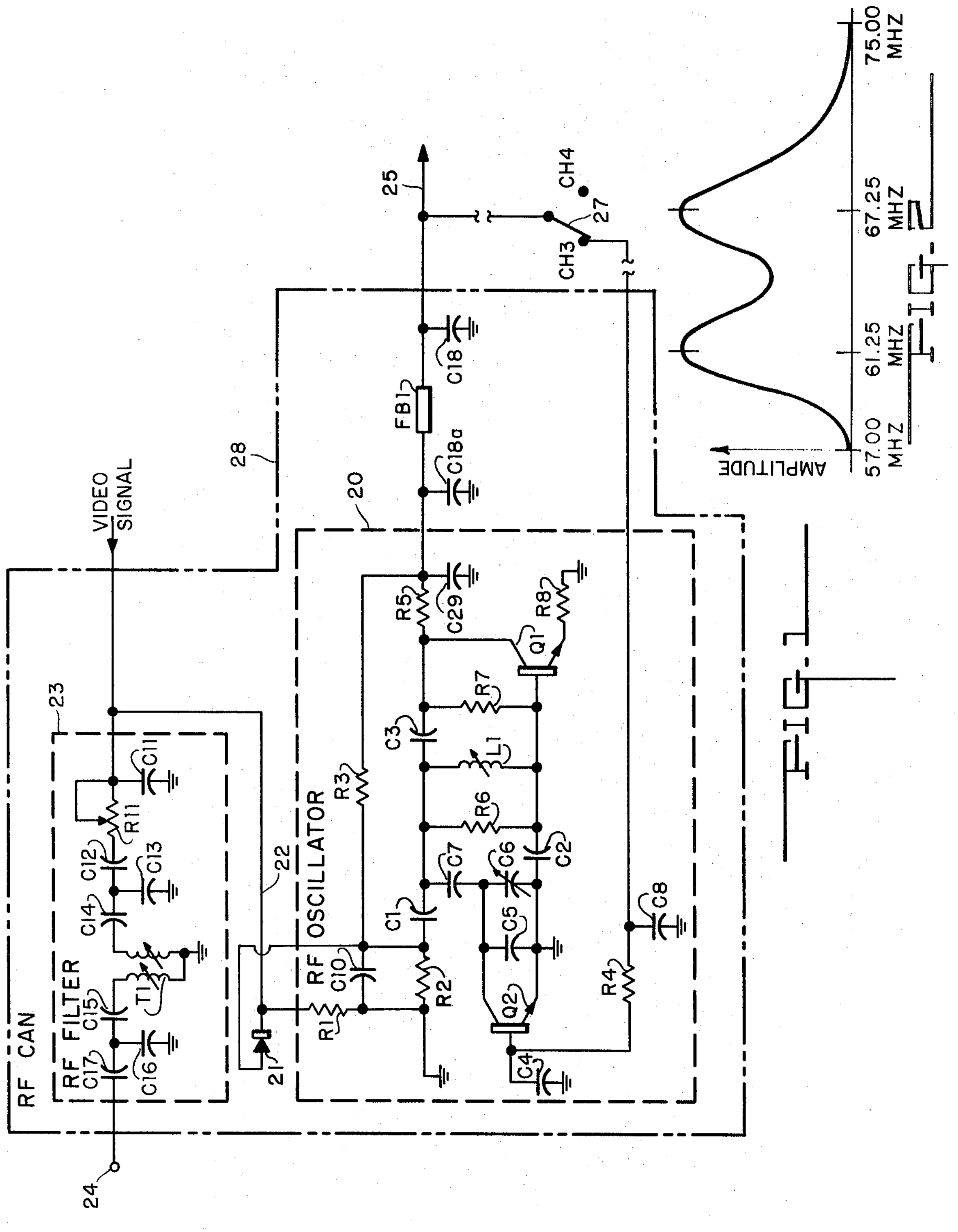
FIG. 1 is a schematic showing of a preferred embodiment of this invention.
FIG. 2 is a graph showing passband characteristics of the rf filter in FIG. 1.

In FIG. 1 is shown generally an rf oscillator 20 which has a dual mode frequency output to the anode of diode 21, which is an rf modulator for modulating the oscillator signal with an rf signal, such as a composite video signal, appearing on line 22. The modulated signal is then filtered by dual mode rf filter 23 having output at 24 which is provided with suitable connecting means to TV receiver antenna terminals or other device.

RF Oscillator 20

The oscillator circuit comprises oscillator transistor Q1, adjustable inductance L1, and capacitances C2, C5, C6, and C7. A dc potential, such as 5.6 volts, is applied to line 25. R7 is a resistor and biases Q1 into conduction which conduction is reinforced by the oscillations in the tank circuit 26 which comprises L1, C2, C5, C6, and C7. The frequency of oscillations are determined by the characteristics of Q1 and the inductance and capacitance of the tank circuit and operates in the general manner of a Colpitts oscillator.

The capacitance value of the tank circuit 26 is changed when a transistor Q2 is biased into conduction shunting the capacitance C5 and C6, increasing the capacitance of the tank circuit and lowering the oscillatory frequency. When Q2 is closed or conducting, the oscillation frequency in the embodiment disclosed corresponds to that of Channel 3 in television broadcasting or 61.25 MHz. When Q2 is open, or not conducting, the frequency is raised to that corresponding to the carrier frequency of Channel 4 of TV broadcasting, or a frequency of 67.25 MHz.

Switch 27 is a single pole double throw switch which may be located remotely from the oscillator 20 and controls the operation of transistor Q2. When switch 27 is in the Ch3, or Channel 3, position, the base of transistor Q2 is connected to the 5.6 volt line 25 closing the transistor and shunting out capacitances C5 and C6 thereby lowering the oscillation rate of the oscillator circuit. When switch 27 is in *Ch* 4, or Channel 4, position, transistor Q2 is opened and capacitors C5 and C6 are replaced into the oscillatory circuit, increasing the oscillations to the Channel 4 frequency. The leads to switch 27 from oscillator 20 are effectively decoupled from all rf energy by capacitors C4, C8, C29, C18*a* and C18 and Ferrite bead FB1. In this manner, the oscillator 20, which is shielded by an rf shield can 28, may be located remotely from the control panel area where switch 27 is located and the leads from can 28 to switch 27 may be ordinary unshielded conductive wire. This provides a significant saving not only in material but in assembly time of the unit and eliminates the rf radiation problem associated with the leads to switch 27. Resistance R5 is a load resistor for transistor Q1, resistance R4 is a current limiting resistor to protect Q2; resistances R2, R3 are bias resistors for diode 21; and resistance R1 is a cathode resistor for diode D1. R6 is a tank loading resistance and R8 is a gain controlling resistance of the oscillator stage.

RF Filter 23

In this embodiment, oscillator 20 supplies two carrier frequencies; one for channel 3 of a TV receiver and one for channel 4. Diode 21 has its anode connected to the output of tank circuit 26 and its cathode connected to a source of modulating voltage such as a composite video signal, which is mixed with the oscillator signal, and then filtered by rf filter 23. Filter 23 is a closely coupled transformer filter having the filter characteristics shown in FIG. 2, passing channel 3 frequency at 61.25 MHz and channel 4 frequency at 67.25 Mhz. Variable resistor R11 is an amplitude level adjuster, capacitors C11 and C17 are impedance matching capacitors, capacitor C12 is a coupling and impedance matching capacitor, capacitors C13, C14, C15, and C16 are frequency determining capacitances and T1 is the closely coupled transformer having both primary and secondary inductances adjustable to tune the primary and secondary circuits. Rf filter circuit 23, therefore, passes only signals on channels 3 and 4 by virtue of the closely coupled transformer T1 filter action along with capacitors C13, C14, C15, and C16.

Rf filter circuit 23 and oscillator circuit 20 are enclosed in rf radiation can 28 which effectively shields the rf frequency radiation.

OPERATION

In the operation of the embodiment shown in FIG. 1, oscillator circuit 20, which is connected as a well-known Colpitts oscillator is set to operate at one of two frequencies corresponding to carrier frequencies for channels 3 and 4 in the vhf television band. The circuit used for channel 4 oscillation is transistor Q1, inductance L1, capacitances C2, C3, C5, C6, and C7. The circuit utilized for channel 3 oscillations is transistor Q1, inductance L1, and capacitances C2 and C7 with capacitances C5 and C6, being shorted out to ground by transistor Q2 in its conductive state. Transistor Q2 conduction is controlled by switch 27 which is outside of the rf shield can 28 and has two positions, C*h* 3 and C*h* 4. In the C*h* 3 position, transistor Q2 is in its conductive state, since its base is connected to the 5.6 volt line 25, while transistor Q2 is in a nonconductive state when switch 27 is in the C*h* 4 position.

All of the high frequency rf energy is filtered from the lines between can 28 and switch 27 so that only dc current is carried in the lines to switch 27 which current does not give rise to a radiation problem. Switch 27 can be located at any distance from the rf oscillation without rf radiation from the lines.

The oscillator signal from oscillator 20 is modulated at diode 21 and then passed to filter 23 which will pass either channel 3 or channel 4 signals to output 24.

In the above circuit, the following component values were used to obtain satisfactory results to accomplish the objectives and advantages of this invention:

| Reference Numbers | Components | |
|---|---|---|
| R1 | 2.2 | Kilohms |
| R2 | 2.2 | Kilohms |
| R3 | 6.8 | Kilohms |
| R4 | 4.7 | Kilohms |
| R5 | 4.7 | Kilohms |
| R6 | 1.5 | Kilohms |
| R7 | 120 | Kilohms |
| R8 | 27 | Ohms |
| R11 | 1 | Ohms |
| C1 | 1.2 | Picofarads |
| C2 | 100 | Picofarads |
| C3 | 220 | Picofarads |
| C4 | 1000 | Picofarads |
| C5 | 6.8 | Picofarads |
| C6 | 3–12 | Picofarads |
| C7 | 10 | Picofarads |
| C8 | 1000 | Picofarads |
| C9 | 1000 | Picofarads |
| C10 | 15 | Picofarads |
| C11 | 47 | Picofarads |
| C12 | 47 | Picofarads |
| C13 | 100 | Picofarads |
| C14 | 24 | Picofarads |
| C15 | 27 | Picofarads |
| C16 | 100 | Picofarads |
| C17 | 100 | Picofarads |
| C18a | 1000 | Picofarads |
| C18 | 1000 | Picofarads |
| Q1 | 139N2 | |
| Q2 | 142N2 | |
| L1 | .5 | Microhenries |
| T1 Primary | .3 | Microhenries |
| T1 Secondary | .3 | Microhenries |

The quantities in the Components refer to the components having the respective reference numerals in the Reference Numbers column.

It will be understood that modifications and variations may be effected without departing from the spirit and scope of the novel concepts of this invention.

Numerous modifications of the disclosed preferred embodiment may be made according to the teaching of this invention which is defined in the following claims.

What is claimed is:

1. Frequency selection apparatus comprising
closely coupled double tuned transformer means responsive to one of two tuned frequencies,
oscillator means coupled to said transformer means,
first means to oscillate said oscillator means at a first frequency corresponding to one of said two tuned frequencies of said transformer means,
second means to oscillate said oscillator means at a second frequency corresponding to the other of said two tuned frequencies of said transformer means,
first switch means to actuate said first means in a first switch position and to actuate said second means in a second switch position,
second switch means to actuate said first switch means,
filter means being between said first and second switch means to filter out the oscillatory signals of said oscillator means whereby the coupling between said filter means and said second switch means will not have said oscillatory signals channeled therein.

2. Switchable radiation protected apparatus comprising
oscillator means,
first reactance means coupled to said oscillator means to establish a first oscillator frequency,
second reactance means coupled to said oscillator means to establish a second oscillator frequency,
first switch means having a first switch condition to switch said first reactance into said oscillator means and a second switch condition to switch said second reactance means into said oscillator means thereby switching said oscillator from said first oscillator frequency to said second oscillator frequency, respectively,
radio frequency protective means for enclosing said oscillator means, said first and second reactance means and said first switch means,
said second switch means being located remotely from said radio frequency protective means and coupled to said first switch means for switching said first switch means from said first switch condition to said second switch condition,
high frequency filter means being between said first and second switch means to substantially eliminate high frequency signals at said second switch means whereby said second switch means will be relatively radiation-free.

3. The apparatus of claim 2 with filter means comprising a closely coupled transformer having two passbands coupled to said oscillator means, said passbands for passing said first and second oscillator frequencies, respectively.

4. The apparatus of claim 2 with modulating means being coupled to said oscillator means for modulating the output frequency of said oscillator means,

5. Apparatus comprising
radiation means,
first means for operating said radiation means in a first mode,
second means for operating said radiation means in a second mode, shield means for enclosing said radiation means and said first and second means to shield the radiations emanating from said radiation means, switch means for switching from said first means to said second means, said switching means being located externally of said shield means, coupling means being between said shield means and said switch means, means for controlling said switching from said first means to said second means upon actuation by said switch means through dc energy whereby said coupling means and said switch means will be free of non-dc radiation energy.

6. The apparatus of claim 3 with second switch means being within said shield means and operative on a change of dc signal to enable at any one time only one of said first and second means so that said radiation means will be operated in only one mode at a time, said switch means being coupled to said second switch means to change the dc level at said second switch means.

* * * * *